May 14, 1935.  C. F. HAUNZ  2,001,421
BATTERY SEPARATOR
Filed July 21, 1933
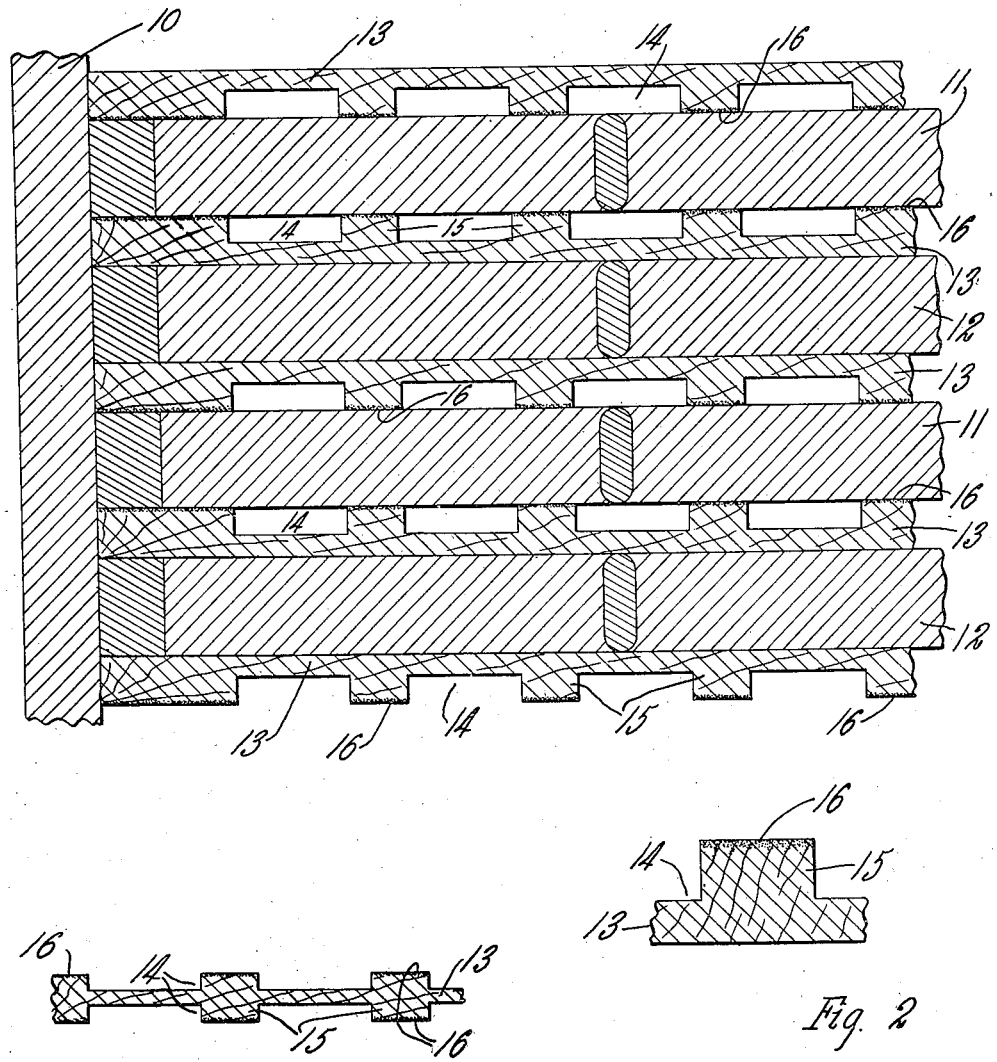
INVENTOR
Charles F. Haunz
by Parker, Proehnow & Farmer
ATTORNEYS Patented May 14, 1935

2,001,421

UNITED STATES PATENT OFFICE 2,001,421

BATTERY SEPARATOR

Charles F. Haunz, Buffalo, N. Y.

Application July 21, 1933, Serial No. 681,590

12 Claims. (136—145)

This invention relates to storage batteries, and particularly to the insulating separators or partitions which are interposed between the plates thereof. Such insulating partitions are, in most cases, thin boards of wood which are grooved to facilitate the circulation of the acid electrolyte. While separators of various insulating materials have been tried with more or less success, wood is today accepted as the conventional or more widely utilized separating medium, even in the very large storage cells of submarine boats and power stations, due to the fact that wood has ideal physical characteristics and porosity. The wood separators are gradually pulpified or disintegrated in the acid electrolyte, and particularly so on the side or face thereof which is in direct contact with the positive plate or electrode.

When a storage battery is being charged, acid is exuded from the active materials of the plate, and free or nascent oxygen is also liberated along the same face of the plate. The exuded acid, in contact with the separators, particularly at the crest faces of the ribs, frequently reaches such concentration during rapid charging that it carbonizes the organic structure of the wood, and the nascent oxygen causes a decomposition of the cellulose of the wood. The continued flexing of the structure of the wood separator, by the escaping gases at the plate surfaces, also contributes mechanically to the deterioration of the wood separators. The small voids in the faces of a separator are receptive to minute particles of peroxide and sulphate, which gradually fill up the pores or voids and cause an increase of volume and of the internal resistance of the separator.

An object of this invention is to provide an improved wood separator for storage batteries which will eliminate or decrease the immediate contact between the peroxide of the plate and the wood; which will largely prevent or limit chemical attack upon the wood structure of the separator; which will generally strengthen the separator, thereby making mechanical action thereon of the gases less effective; and which will prevent or minimize the invasion of solid particles into the structure of the wood.

Another object of the invention is to provide an improved wood separator for storage batteries which will have long and maximum life during use; which will more successfully resist deterioration through the action of the nascent oxygen and the acid of the electrolyte; which will not be materially thicker than separators heretofore in common use, and which will be relatively simple, durable and inexpensive.

Various other objects and advantages will be apparent from the following description of an embodiment of the invention, and the novel features will be particularly pointed out hereinafter in connection with the appended claims.

In the accompanying drawing:

Fig. 1 is a sectional plan, on an enlarged scale, of a portion of a storage battery having wood separators constructed in accordance with this invention.

Fig. 2 is an enlarged sectional plan of a portion of one of the separators; and

Fig. 3 is a sectional plan of a portion of a separator, and illustrating the application of the invention to a slightly different type of separator.

In the illustrated embodiment of the invention I provide within the usual or any suitable battery casing 10, a plurality of positive plates or electrodes 11 and a plurality of negative plates or electrodes 12, the positive and negative plates or electrodes being arranged side by side alternately. Wood separators 13 are interposed between adjacent plates 11 and 12, and these wood separators are provided with vertically extending grooves 14 in one or both faces thereof, and especially in the face abutting the positive plate. The face of each separator which abuts the negative plate is usually and preferably made rather rough so that the electrolyte may easily reach all portions of the surface or face of the negative plate. The grooves 14 are separated by ribs 15 which are usually of lesser width than the grooves. This is the conventional or common type of storage battery, and this invention relates to the preliminary treatment of the wood separator 13.

In accordance with this invention, I provide a suitable protective coating 16 upon the crest faces of the ribs 15, or the improved portions of the face of each separator, and this coating is one which will not interfere with the chemical action normally occurring in the battery while the battery is being charged or discharged. This coating may be of various materials that are chemically inert in the battery, but is preferably a metallic coating, and I have found that metallic lead and antimony are both particularly satisfactory as the coating material. I have also discovered that a mixture of metallic lead and antimony may be advantageously employed, a mixture of ninety parts of lead and ten parts of antimony giving excellent results. The coating should be relatively thin, and I have found that a coating having an approximate thickness of from two to four thousandths of an inch is very satisfactory. The surfaces of the separators within the grooves are not treated and, therefore, the acid may pass from face to face of each separator through the pores of the grooved portions thereof, and the insulating property of the separator is not destroyed.

The metallic coating is preferably applied to the separator by impregnating the surface portion of the separator with molten or fluid metal, and during such impregnation the molten or fluid metal penetrates the pores of the separator and firmly affixes itself thereto. This impregnation of the pores prevents the entry into the separator structure of the nascent oxygen and concentrated acid and thus effectively protects the separator at the surface areas that are subjected to the most destructive action during the charging of the battery.

A machine which may be satisfactorily employed for impregnating the surface of the wood with molten metal is described and claimed in my prior, copending application, Ser. No. 586,861, filed January 15, 1932. In accordance with the disclosure of that application, molten metal is forced under pressure against the face area of a body of wood to be coated and the molten metal penetrates the pores of the wood and adheres thereto. The depth of penetration can be controlled by varying the pressure exerted on the molten metal, the temperature of the metal, and the duration of contact, but obviously other means for coating or impregnating wood with metal may be employed, if desired, within the broader concept of the invention.

In Fig. 3 I have illustrated the separator as having grooves 14 upon both faces thereof, so as to have ribs that abut against both positive and negative plates, and the crest faces of the ribs upon both sides or faces of the separator are impregnated or coated with the molten metal in the same manner.

The metallic coating upon the crest faces of the ribs does not destroy the insulating property of the separator, nor materially interfere with the free flow of the electrolyte from face to face through the separator, because this flow normally occurs through the thin part of the separator which is at the bottoms of the grooves or between the ribs. The metallic coating on the ribs effectively protects the wood from deterioration due to the action of the acid and the nascent oxygen which is liberated at the positive plates during the charging operation and, therefore, the life of a storage battery having separators treated in this manner is very greatly increased, yet the treated separators are not materially thicker, nor is their conductivity impaired, but rather enhanced.

The positive electrode is in direct contact with the wood separator. The action of the strong acid, in combination with the nascent oxygen liberated in the battery, breaks down the cellulose content of the wood, forming organic acids, principally acetic acid. Such acids have deleterious effects on the active materials of the plates, and cause loss of efficiency.

It will be obvious that various changes in the details and materials, which have been herein described and illustrated in order to explain the nature of the invention, may be made by those skilled in the art within the principle and scope of the invention as expressed in the appended claims.

I claim as my invention:

1. A separator for storage batteries, comprising a thin board of wood having portions only of a face thereof coated with a metallic substance.

2. A separator for storage batteries comprising a thin board of wood having grooves in a face thereof, the ungrooved portions of said face having a metallic protecting coating and the grooved portions being free of said coating.

3. A separator for storage batteries comprising a thin board of wood having grooves in a face thereof, the ungrooved portions of said face being impregnated to a slight depth with a metallic substance, and the grooved portions being free of said impregnation.

4. A separator for storage batteries, comprising a thin board of wood having spaced ribs on opposite faces thereof, the crest faces of said ribs being impregnated to a slight depth with a metallic substance, and the other faces of the ribs being free of said impregnation.

5. A separator for storage batteries comprising a thin board of wood having ribs on a face thereof, the crest faces of said ribs being impregnated with a thin layer of a metallic substance, the portions of said board between said ribs being free of said layer.

6. A separator for storage batteries comprising a thin board of wood having ribs on a face thereof, the crest faces of said ribs being impregnated to a small depth with a metallic substance containing lead and antimony, and the remainder of said board being free of said substance.

7. A separator for storage batteries comprising a thin board of wood having ribs on a face thereof, the crest faces of said ribs being impregnated to a small depth with a metallic substance containing lead and antimony in the proportion of ninety parts of lead and ten parts of antimony, and the portions between the ribs being free of such impregnation.

8. A separator for storage batteries comprising a thin board of wood having ribs on a face thereof, the crest faces of said ribs being impregnated to a depth of approximately .002 to .004 inch with a metallic substance, and the portions between the ribs being free of such impregnation.

9. A separator for storage batteries comprising a thin board of wood having ribs on a face thereof, the crest faces of said ribs being impregnated to a slight depth with a protecting substance containing metallic lead, and the portion of the board between the ribs being free of said substance.

10. A separator for storage batteries comprising a thin board of wood having ribs on a face thereof, the crest faces of said ribs being impregnated to a slight depth with a substance containing metallic antimony, and the portion of the board between the ribs being free of said substance.

11. A separator for storage batteries comprising a thin board of wood having ribs on a face thereof, the crest faces of said ribs having a surface coating of metallic lead and antimony, and the portion of the board between the ribs being free of said coating.

12. A separator for storage batteries comprising a thin board of wood having ribs on a face thereof, the crest faces of said ribs having a surface coating, extending to a slight depth into the pores of the wood, of metallic lead and antimony in the proportion of approximately 90 parts of lead to 10 parts of antimony, and the portions between the ribs being free of such impregnation.

CHARLES F. HAUNZ.